June 20, 1933.  A. D. FERGUSON  1,914,495

VALVE MECHANISM

Filed Dec. 23, 1927

Inventor:
Alexander D. Ferguson.

Patented June 20, 1933

1,914,495

UNITED STATES PATENT OFFICE

ALEXANDER D. FERGUSON, OF MICHIGAN CITY, INDIANA, ASSIGNOR TO SULLIVAN MACHINERY COMPANY, A CORPORATION OF MASSACHUSETTS

VALVE MECHANISM

Application filed December 23, 1927. Serial No. 242,108.

This invention relates to valve mechanisms, and more particularly to such mechanisms of a type suitable for use in air compressors.

One object of the invention is to provide an improved valve mechanism. Another object is to provide an improved resilient guard or abutment for a valve such as is usually employed in air compressors. It has been found that when the guards for the usual type of valves used in air compressors are made in a single piece difficulty is sometimes encountered due to breakage, either of the valve guard itself, if it is not made heavy enough, or of the valve or valve spring when the valve guard is made heavy. To provide a construction free from both of these difficulties is a further, more specific object of my invention. Other objects and advantages of the invention will appear hereafter.

Figure 1:
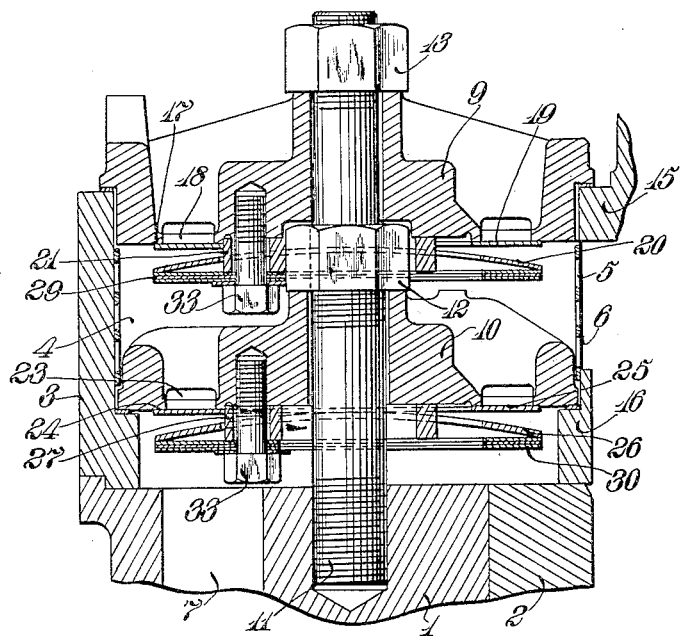

In the accompanying drawing in which for purposes of illustration there is shown one embodiment which the invention may assume in practice:

Fig. 1 is a central section through a compressor valve mechanism embodying the illustrative form of the invention.

Figure 2:
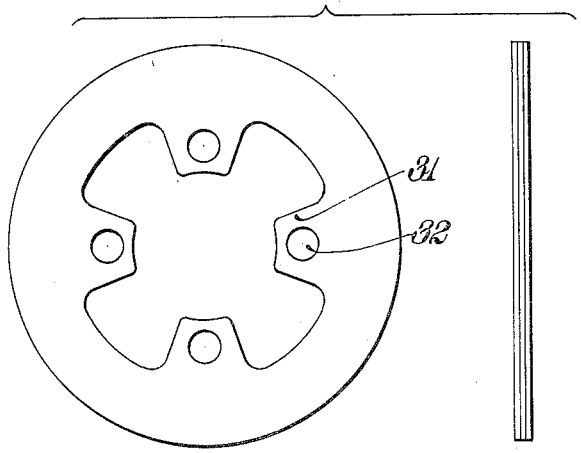

Fig. 2 comprises a plan view and an edge view of a laminated valve guard.

Referring to the drawing, a portion of a compressor cylinder member is shown at 1. This cylinder member is provided with a liner 2 and has associated therewith a head member 3. Within the head member a chamber 4 is formed which is divided into different portions by valve cage elements later described. One of these portions communicates through openings 5 formed in a perforated cylindrical guard member 6 with the bore of the cylinder, while another portion communicates through a passage 7 with the discharge space of the compressor cylinder.

The valve mechanism comprises a pair of cage or seat elements 9 and 10, the element 9 being the inlet valve seat element and element 10 the discharge valve seat element. These valve seat elements are held in position by means of a stud 11 threaded in the cylinder member 1, and having associated therewith nuts 12 and 13 which serve respectively to hold the cage elements 10 and 9 in position. Each of the cage elements is held in tight sealing engagement with a shoulder formed in the head element 3. As a preferred mode of obtaining such a seal I have shown gaskets sealing the joints between the cage elements and the shoulders. The portions of the head element 3 which provide the shoulders are respectively designated 15 in the case of the inlet cage element and 16 in the case of the discharge cage element. The inlet valve seat or cage element 9 has a valve seat 17 formed thereon surrounding a port 18. A valve 19, of comparatively thin flexible metal, is associated with the seat 17 and normally held in closed position by a transversely bowed annular spring 20. The spring 20 and the valve 19 are guided during movement by a winged guide member 21. Similarly, the discharge seat or cage element 10 is provided with an annular port 23, surrounded by a valve seat 24, with which an annular valve 25 cooperates. The valve 25 is yieldingly seated by a valve spring 26 guided by a winged guard 27.

Mounted in spaced relation to each of the valves mentioned above is a laminated valve guard built up of plates or sheets of thin resilient material. The inlet valve guard structure is designated generally 29 and the discharge valve structure is designated 30. Each of these is provided with a series of inwardly projecting portions 31 having apertures 32 formed therein to receive the bolts 33 which serve to secure the guards and guide elements in rigid relation to the seat elements.

The mode of operation of the structure described is as follows: Upon the suction stroke of the compressor piston, the valve 19 is forced from its seat by atmospheric pressure; and air flows into the central portion of the chamber 4 and through the openings 5 in the foraminous member 6 into the cylinder bore. Upon the working stroke of the compressor piston, the air is compressed and forced through the ports 23, the valve 25 being forced off its seat 24. The compressed air then flows out through the discharge passage 7. Each valve is automatically seated, when the flow of air through its port ceases, by the transversely flexed spring; and the opening movement of the valve is gently cushioned by the laminated valve guard which, while strong enough to prevent breakage, possesses sufficient resilience to eliminate a great part of the hammering action incident to the opening of the valve. As a result of the improved construction a mechanism which is quieter in operation and much more durable is secured. This mechanism is a particularly important improvement in view of the high speed operation of the modern compressor, and has largely eliminated trouble from breakage of valves and valve springs whenever used.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a pump valve mechanism, a valve cage element providing a valve seat, a valve associated with said cage element for movement toward and away from said seat, a resilient abutment for said valve of laminated construction, and a spring loosely disposed between said valve and abutment, said valve tensioning said spring against said abutment during opening movement.

2. A pump valve mechanism comprising a cage element providing a flat valve seat, a valve movable toward and from said seat, a guard for limiting movement of said valve from said seat, said guard being arranged in spaced relation with reference to said seat and comprising a plurality of superimposed, similar, resilient elements having relatively narrow supporting tongues, and a spring loosely disposed between said valve and said guard, said valve tensioning said spring against said guard during opening movement.

3. In a pump valve mechanism, a cage element comprising a valve seat, a thin flat annular valve associated with said seat, a transversely flexed annular spring for maintaining said valve seated, and a resilient abutment for maintaining a normal pressure upon said spring and for limiting movement of the valve away from said seat comprising a plurality of superimposed resilient elements having inwardly extending supporting projections.

4. In a pump valve mechanism, a valve seat, a spaced parallel inherently resilient guard, a valve cooperating with said seat, and a spring loosely disposed between said valve and guard, said valve tensioning said spring against said guard during opening movement of said valve.

5. In a pump valve mechanism, a valve seat, a spaced parallel inherently resilient guard, a valve cooperating with said seat, and a transversely flexed spring loosely disposed between said valve and guard, said valve tensioning said spring against said guard during opening movement of said valve.

6. In a pump valve mechanism, a valve seat, a valve associated with said seat, a separate spring for maintaining said valve seated, and, in spaced relation to said seat, a resilient abutment for maintaining a normal pressure upon said spring and for limiting movement of the valve away from said seat comprising a plurality of superimposed resilient elements.

7. In a pump valve mechanism, a valve seat, a valve cooperating therewith and loosely disposed thereon, a spring of substantially the same shape as said valve, and an inherently resilient guard having an abutment portion of substantially the same shape as said valve maintained in spaced relation to said seat, said valve tensioning said spring against said guard during opening movement of said valve.

8. In a pump valve mechanism, a valve seat, a valve associated with said seat, a separate spring for maintaining said valve seated, and, in spaced relation to said seat, an inherently resilient abutment for maintaining a normal pressure upon said spring and for limiting the movement of the valve away from its seat, said valve and spring being loosely confined between the seat and abutment, and said abutment having inner and outer peripheries and being fixed adjacent one periphery thereof in substantially rigid relation to said seat.

9. In a pump valve mechanism, an annular valve seat, an annular valve thereon, a resilient valve spring, means cooperating with the inner periphery of said valve and of said valve spring for maintaining them in coaxial relation with said seat during opening and closing movements of said valve while permitting free relative movement between valve and spring and between both and the valve seat, and a generally annular resilient abutment having a free outer periphery overlying said seat and maintaining said spring under compression, said abutment being fixed adjacent its inner periphery in substantially rigid relation to the valve seat.

10. In a pump valve mechanism, an annular valve seat, an annular valve thereon, a resilient valve spring, means cooperating with the inner periphery of said valve and of said valve spring for maintaining them in coaxial relation with said seat during opening and closing movements of said valve while permitting free relative movement between valve and spring and between both and the valve seat, and an inherently resilient abutment having a free outer periphery overlying said seat and maintaining said spring under compression, said abutment having radially inwardly directed portions clamped rigidly with respect to said seat.

11. In a pump valve mechanism, a valve seat, a valve associated with said seat, a spring for maintaining said valve seated, and, in spaced relation to said seat and with a portion thereof rigidly fixed relative to said seat, an inherently resilient abutment for maintaining a normal pressure upon said spring and for limiting movement of the valve away from its seat, said valve and spring being loosely confined between the seat and abutment.

In testimony whereof I affix my signature.

ALEXANDER D. FERGUSON.